(12) United States Patent
Blackburn et al.

(10) Patent No.: US 8,376,632 B2
(45) Date of Patent: Feb. 19, 2013

(54) STRAIN-RELIEF MEMBER AND FIBER OPTIC DROP CABLE ASSEMBLY USING SAME

(75) Inventors: James D. Blackburn, Hickory, NC (US); Mary C. Corpening, Hickory, NC (US); Gregory A. Lochkovic, Conover, NC (US); Allen M. Miller, Lenoir, NC (US); Thomas Theuerkorn, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 337 days.

(21) Appl. No.: 12/721,931

(22) Filed: Mar. 11, 2010

(65) Prior Publication Data

US 2011/0222826 A1    Sep. 15, 2011

(51) Int. Cl.
*G02B 6/36* (2006.01)
(52) U.S. Cl. ............... 385/86; 385/113; 385/84; 385/66
(58) Field of Classification Search .................... 385/86, 385/113, 76, 77, 55–60, 66–68
See application file for complete search history.

(56) References Cited

U.S. PATENT DOCUMENTS

| | | | |
|---|---|---|---|
| 5,094,552 A | 3/1992 | Monroe et al. | 385/76 |
| 5,329,603 A * | 7/1994 | Watanabe et al. | 385/86 |
| 5,390,272 A * | 2/1995 | Repta et al. | 385/100 |
| 5,781,681 A * | 7/1998 | Manning | 385/86 |
| 6,579,024 B2 | 6/2003 | Trowbridge | 403/34 |
| 6,648,520 B2 | 11/2003 | McDonald et al. | 385/78 |
| 7,242,841 B2 * | 7/2007 | Greenwood et al. | 385/137 |
| 7,272,282 B1 * | 9/2007 | Seddon et al. | 385/106 |
| 7,676,132 B1 * | 3/2010 | Mandry et al. | 385/134 |
| 7,695,197 B2 * | 4/2010 | Gurreri | 385/69 |
| 2009/0324183 A1 * | 12/2009 | Bringuier et al. | 385/113 |
| 2012/0063724 A1 * | 3/2012 | Kuffel et al. | 385/78 |

* cited by examiner

*Primary Examiner* — Ellen Kim

(57) ABSTRACT

A strain-relief member having a body formed from a block copolymer and designed for use in a fiber optic drop cable assembly. The body has a central channel and a cylindrical connector-end portion sized to surround an end-portion of a connector. The body also has a tapered cable-end portion sized to surround an end portion of a fiber optic cable that connects to the connector and that has a preferential bend axis. The strain-relief member is configured to limit an amount of strain in the strength components to less than 0.041 when subjected to flex and proof testing. A fiber optic drop cable assembly that has a fiber optic cable with a preferential bend axis and that employs the strain-relief member is also disclosed.

24 Claims, 12 Drawing Sheets

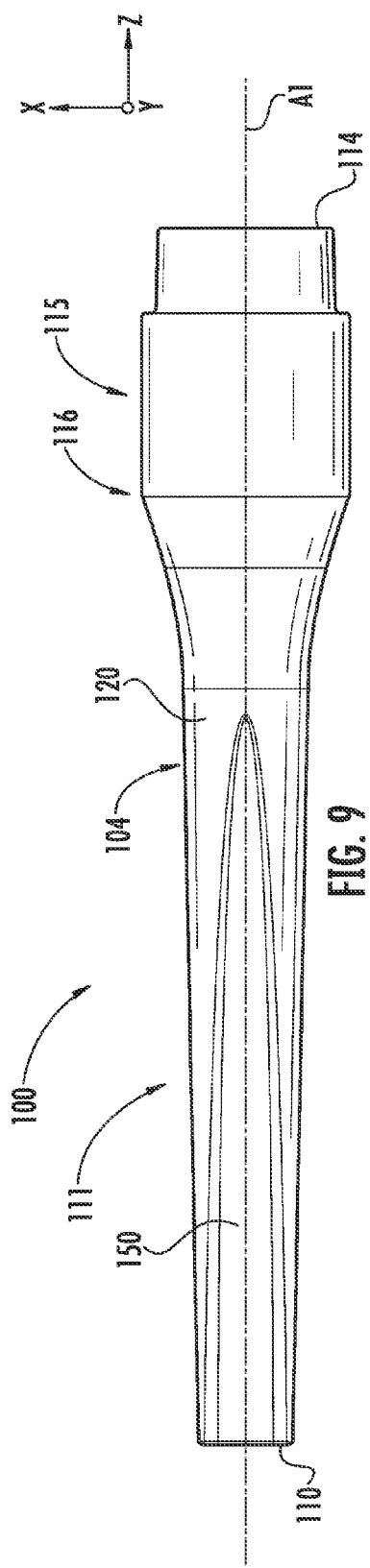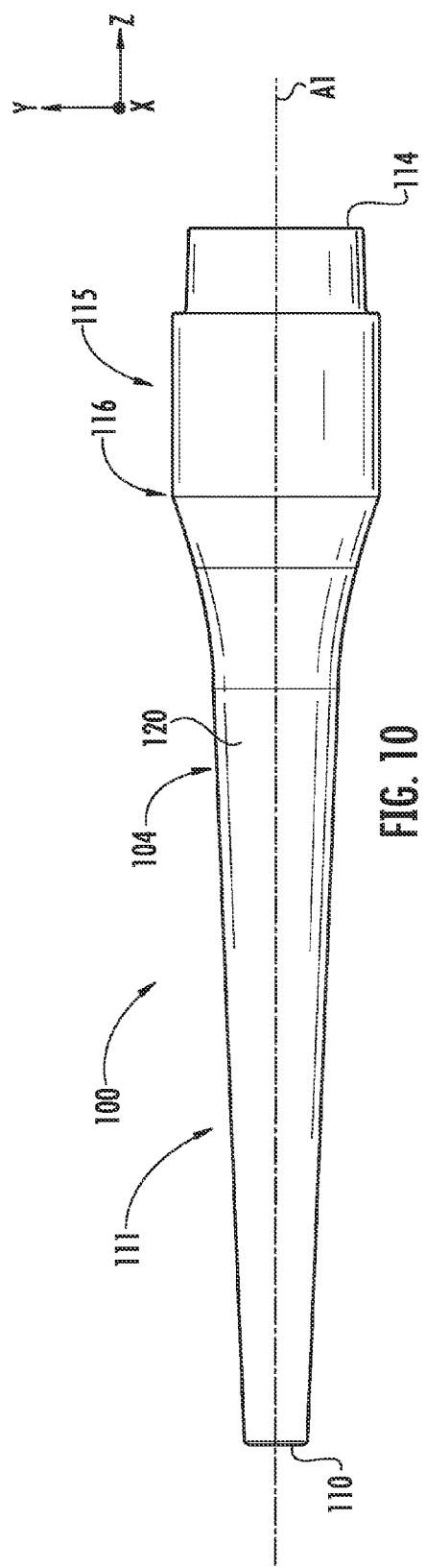

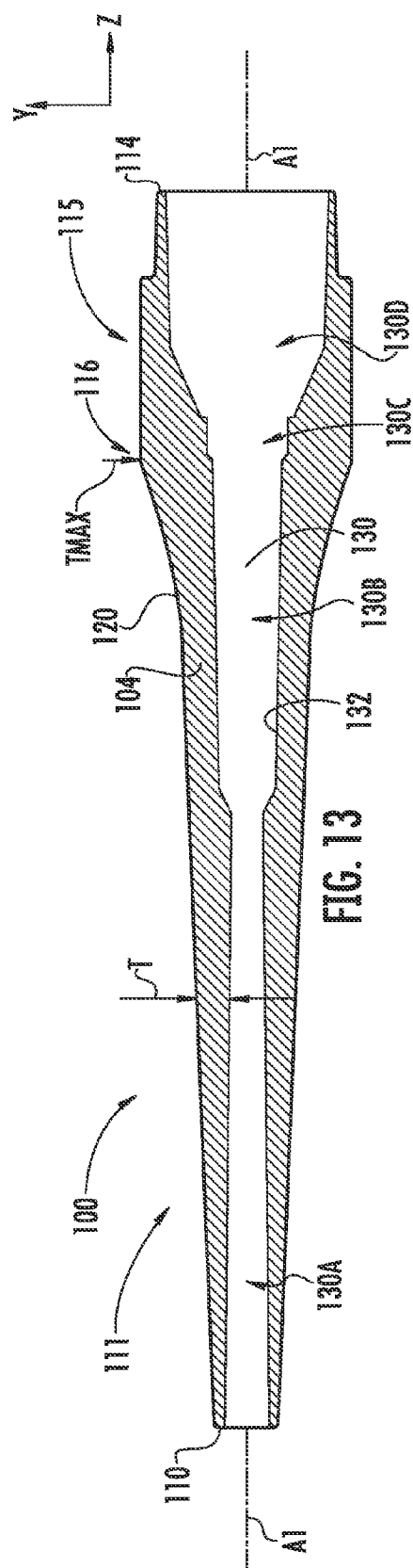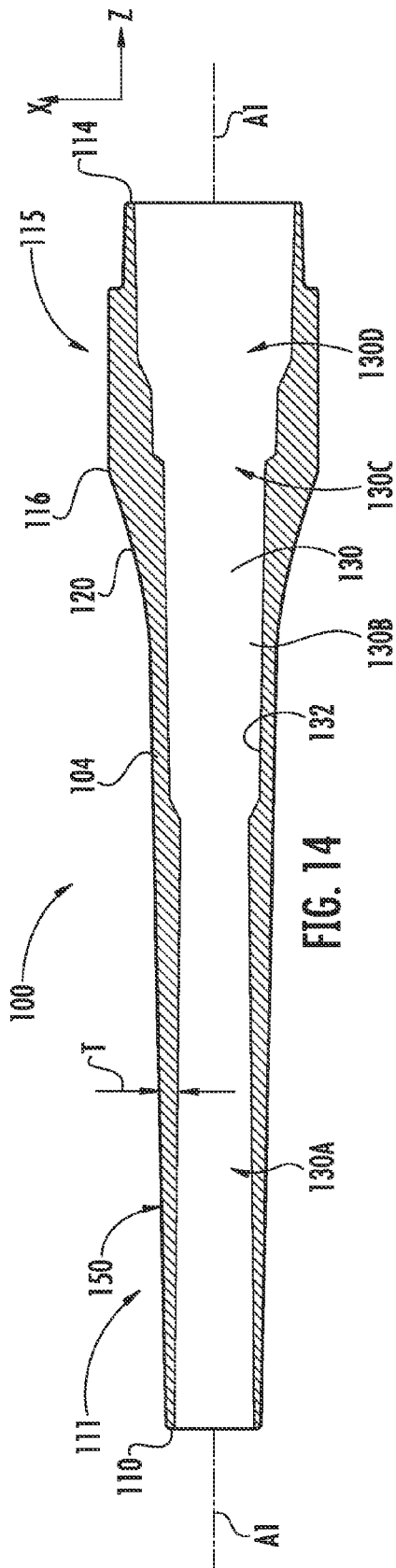

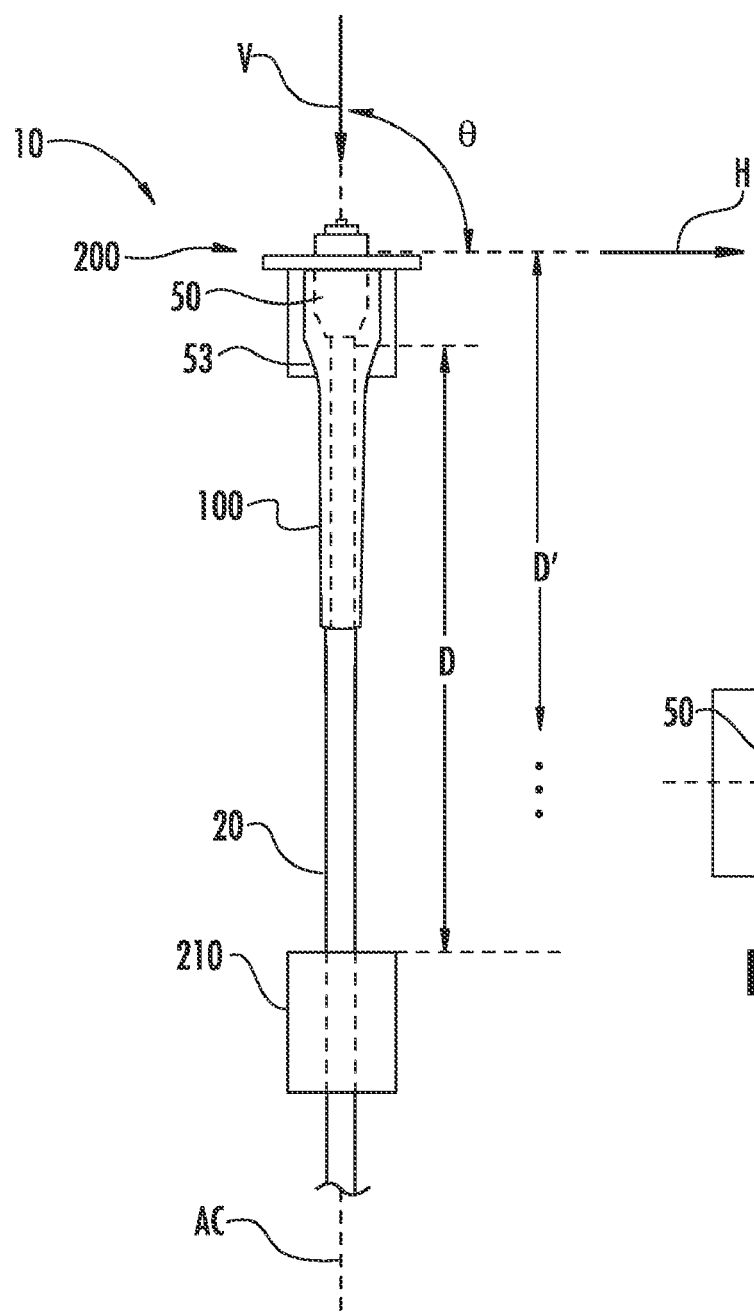
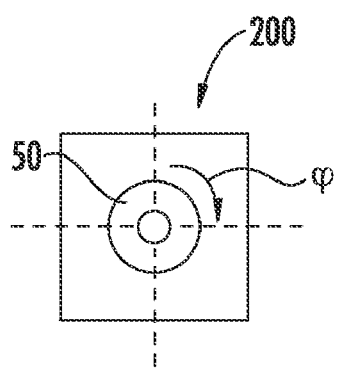
FIG. 15
FIG. 16

STRAIN-RELIEF MEMBER AND FIBER OPTIC DROP CABLE ASSEMBLY USING SAME

FIELD

The present disclosure relates to fiber optic drop cable assemblies, and in particular to a strain-relief member for use with fiber optic drop cable assemblies, and fiber optic drop cable assemblies that utilize the strain-relief member.

BACKGROUND

Various types of connectors have been developed for connecting fiber optic cables to optical system components such as active or passive optical devices, or to other optical cables. Most optical fiber connectors are attached to a strain-relief device on the end of the connector opposite the terminated fiber. As the name suggests, the strain-relief device reduces strain on the fiber optic cable and connector, such as, for example, during pulling on the cable, to avoid violating the minimum bend radius of the optical fiber within the cable. Such bending could lead to attenuation and even breakage of the optical transmission component and strength components in the fiber optic cable.

Fiber optic cables include an optical transmission component that carries optical signals to a home or other locations from a connection point (e.g., a local splice box or fiber distribution terminal (FDT)) on the distribution cable in so-called fiber-to-the-X (FTTX) networks. Such fiber optic cables are referred to in the art as "drop cables." Certain types of drop cables are "flat" drop cables, meaning that the cross-section of the drop cable is oblong to accommodate either a ribbon-type arrangement of the optical fibers therein or to accommodate strength components that run the length of the fiber on opposite sides of the centrally carried fibers. Exemplary drop cables are ROC™, RPX®, SST-Drop™, and ALTOS® Figure-8 Loose Tube cables, available from Corning Cable Systems LLC, Hickory, N.C. A connectorized drop cable is called a "drop cable assembly."

When deployed in the field, a drop cable assembly can experience a mechanical load that strains the connectorized end of the assembly. The in-plane configuration of the strength components and the optical transmission component gives rise to preferential and non-preferential bend axes that cause the drop cable assembly to twist when subjected to bending about the non-preferential axis. The twisting action places a great deal of strain on the strength components and the optical transmission component that, if not mitigated, can damage the drop cable assembly. Unfortunately, conventional strain-relief members used for other types of drop cables (including round cross-section drop cables) are not capable of mitigating the strain that occurs in a drop cable assembly having a preferential bend axis when the assembly is subjected to a mechanical load over a range of possible operating temperatures.

SUMMARY

An aspect of the disclosure is a fiber optic drop cable assembly. The assembly includes a fiber optic cable having a preferential bend axis and having an end portion with an end. The assembly also includes a fiber optic connector having a back end portion with an end, with the connector being operably coupled to the fiber optic cable through the connector end. The assembly further includes a strain-relief member surrounding the fiber optic cable end portion and secured to the connector end portion. The strain-relief member comprises a flexible material and is configured to limit an amount of strain in the strength components to less than 0.041 when subjected to a flex test carried out at −40° C. and +40° C. with −90° and +90° bends, at torsion angles of 0°, +45° and +90°, and with a 15 lb load.

Another aspect of the disclosure is a strain-relief member for a fiber optic drop cable assembly that has a fiber optic cable with a preferential bend axis defined by strength components, and a connector operably connected to the fiber optic cable. The strain-relief member has a body formed from block copolymer and has a central channel along a central axis. The body has a generally cylindrical connector-end portion with a circular cross-section channel section sized to surround an end-portion of the connector. The body also has a generally tapered cable-end portion with an elongate cross-section channel section sized to surround an end portion of the fiber optic cable that connects to the connector. The strain-relief member is configured to limit an amount of strain in the strength components to less than 0.041 when subjected to a flex test carried out at −40° C. and +40° C., with −90° and +90° bends, at torsion angles of 0°, +45° and +90°, and with a 15 lb load.

Another aspect of the disclosure is a fiber optic drop cable assembly. The assembly includes a fiber optic cable having a central optical component and strength components that define a preferential bend axis. The assembly also includes a fiber optic connector operably coupled to the fiber optic cable. The assembly further includes a strain-relief member having a body formed from block copolymer and that defines a central channel along a central axis. The body has a generally cylindrical connector-end portion with a circular cross-section channel section sized to surround an end-portion of the connector, and has a generally tapered cable-end portion with an elongate cross-section channel section sized to surround an end portion of the fiber optic cable that connects to the connector. The strain-relief member is configured to limit an amount of strain in the strength components to less than 0.041 when subjected to a) a flex test carried out at −40° C. and +40° C., with −90° and +90° bends, at torsion angles of +0°, +45° and +90°, and with a 15 lb load, and b) a proof test.

Another aspect of the disclosure is a fiber optic drop cable assembly. The assembly includes a fiber optic cable having at least one optical fiber therein and having at least two reinforced strength components therein. Each of the reinforced strength components have a flexural modulus of about 10 GPa to about 100 GPa and are arranged on generally opposing sides of the at least one optical fiber and defining a preferential bend axis in the cable, the cable further including an end portion. The assembly also includes a fiber optic connector having a termination portion coupled to the fiber optic cable and defining a termination interface. The assembly further includes a strain-relief member surrounding the fiber optic cable end portion and secured to the connector end portion and being substantially water-tight about the termination interface. The strain-relief member has an axial length L extending along the length of the cable and a maximum width W transverse to the length of the cable defining a water-tight covering, the length and width defining an aspect ratio of L divided by W, with the aspect ratio being in a range of 3:1 to 10:1. The strain-relief member comprises a flexible material and is configured to limit an amount of strain in the strength components to less than about 0.041.

These and other advantages of the disclosure will be further understood and appreciated by those skilled in the art by reference to the following written specification, claims and appended drawings.

BRIEF DESCRIPTION OF THE DRAWINGS

A more complete understanding of the present disclosure may be had by reference to the following detailed description when taken in conjunction with the accompanying drawings, wherein:

FIG. 9 and FIG. 10 are top-down and side views of the strain-relief member of FIG. 7 and FIG. 8, respectively;

FIG. 13 and FIG. 14 are cross-sectional views of the strain-relief member of FIG. 9 and FIG. 10 as taken in the Y-Z plane and X-Z plane, respectively;

FIG. 15 is a schematic diagram of the drop cable assembly attached at the connector to a strain-test measurement fixture so that it hangs in a vertical direction, with a weight secured to the drop cable a distance away from the cable end of the stress-relief member;

FIG. 16 is a close-up front-on schematic view of the strain-test measurement fixture holding the connector of the drop cable assembly and illustrating how the fixture can orient the torsional angle φ to strain test multiple orientations of the drop cable assembly;

DETAILED DESCRIPTION

Reference is now made to embodiments of the disclosure, exemplary embodiments of which are illustrated in the accompanying drawings. In the description below, like elements and components are assigned like reference numbers or symbols. Cartesian coordinates are shown in some Figures for the sake of reference, with a black circle indicating a direction into the page and a white circle indicating a direction out of the page.

Figure 1:
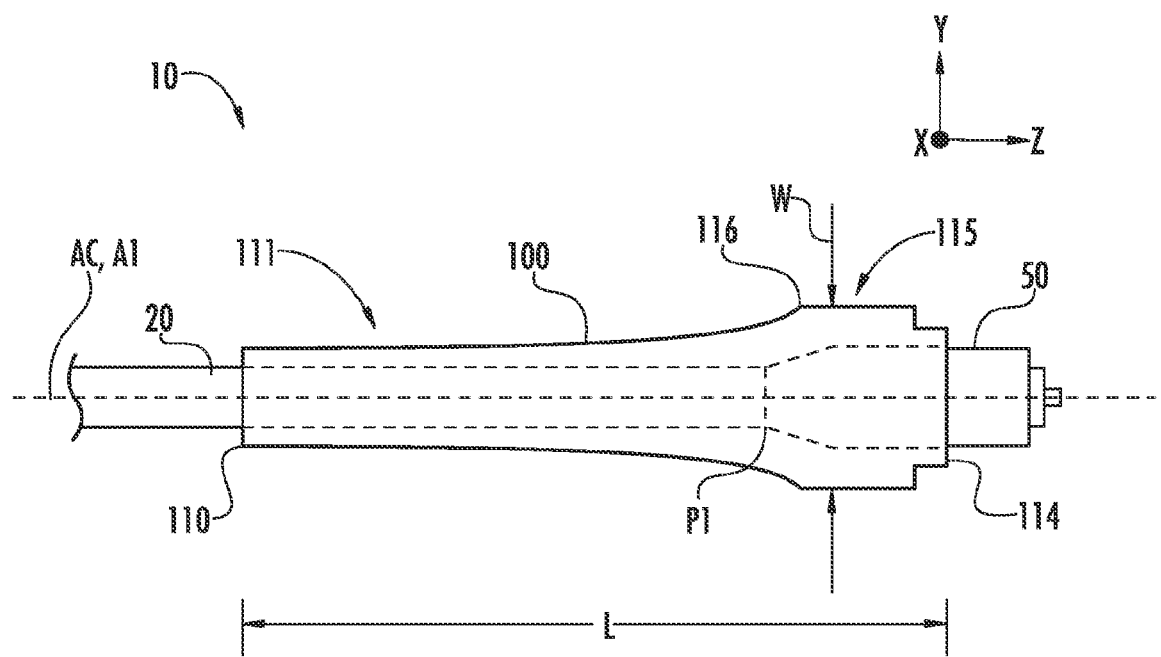
FIG. 1 is a schematic generalized side view of a drop cable assembly having a fiber optic cable with preferential and non-preferential bend axes, a strain-relief member according to the present disclosure, and an optical fiber connector.

FIG. 1 is a schematic side view of a generalized fiber optic drop cable assembly ("cable assembly") 10. Cable assembly 10 has a central axis AC and includes a fiber optic cable ("cable") 20 having preferential and non-preferential bend axes, as discussed below. Cable assembly 10 also includes a fiber optic connector ("connector") 50 operably connected to cable 20, and a cone-like strain-relief member 100 operably connected to the connector and the cable. Strain-relief member 100 has an axis A1, a length L as measured along axis A1, and a maximum width W as measured transverse to axis A1. In an example, strain-relief member 100 has an aspect ratio L/W in the range from 3:1 to 10:1, and in another example has an aspect ratio L/W in the range from 5:1 to 7:1.

Figure 2:
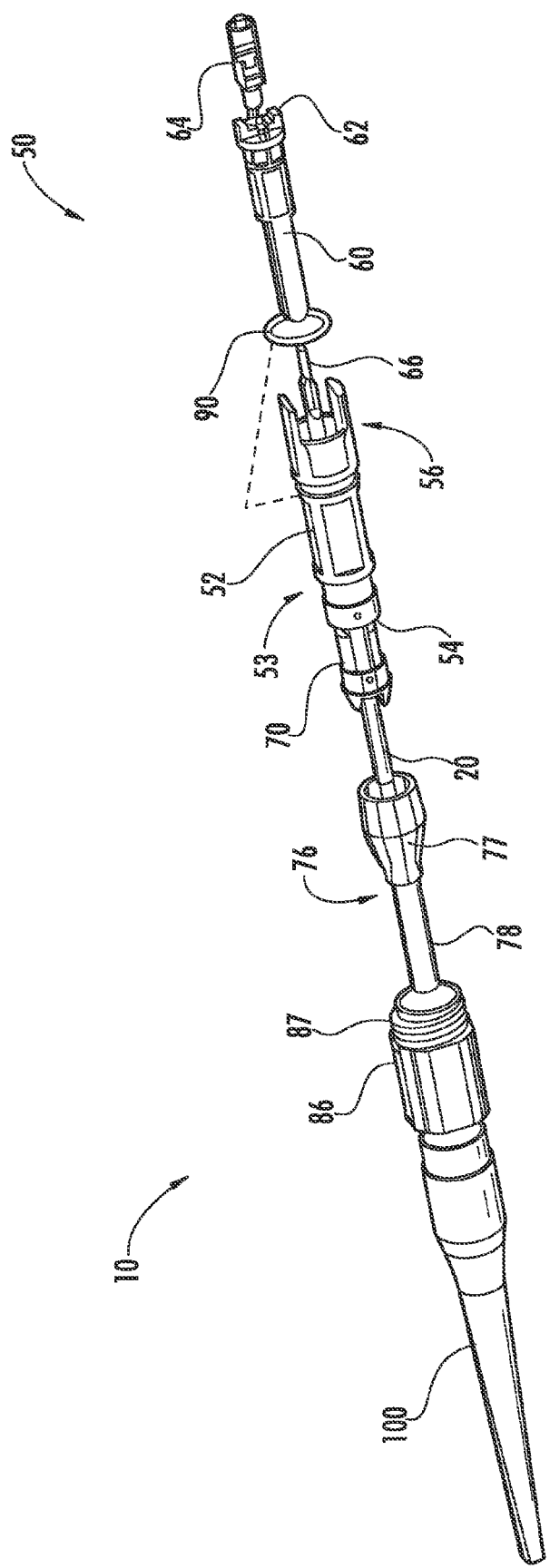
FIG. 2 is an exploded perspective view of an example drop cable assembly of FIG. 1.
Figure 3:
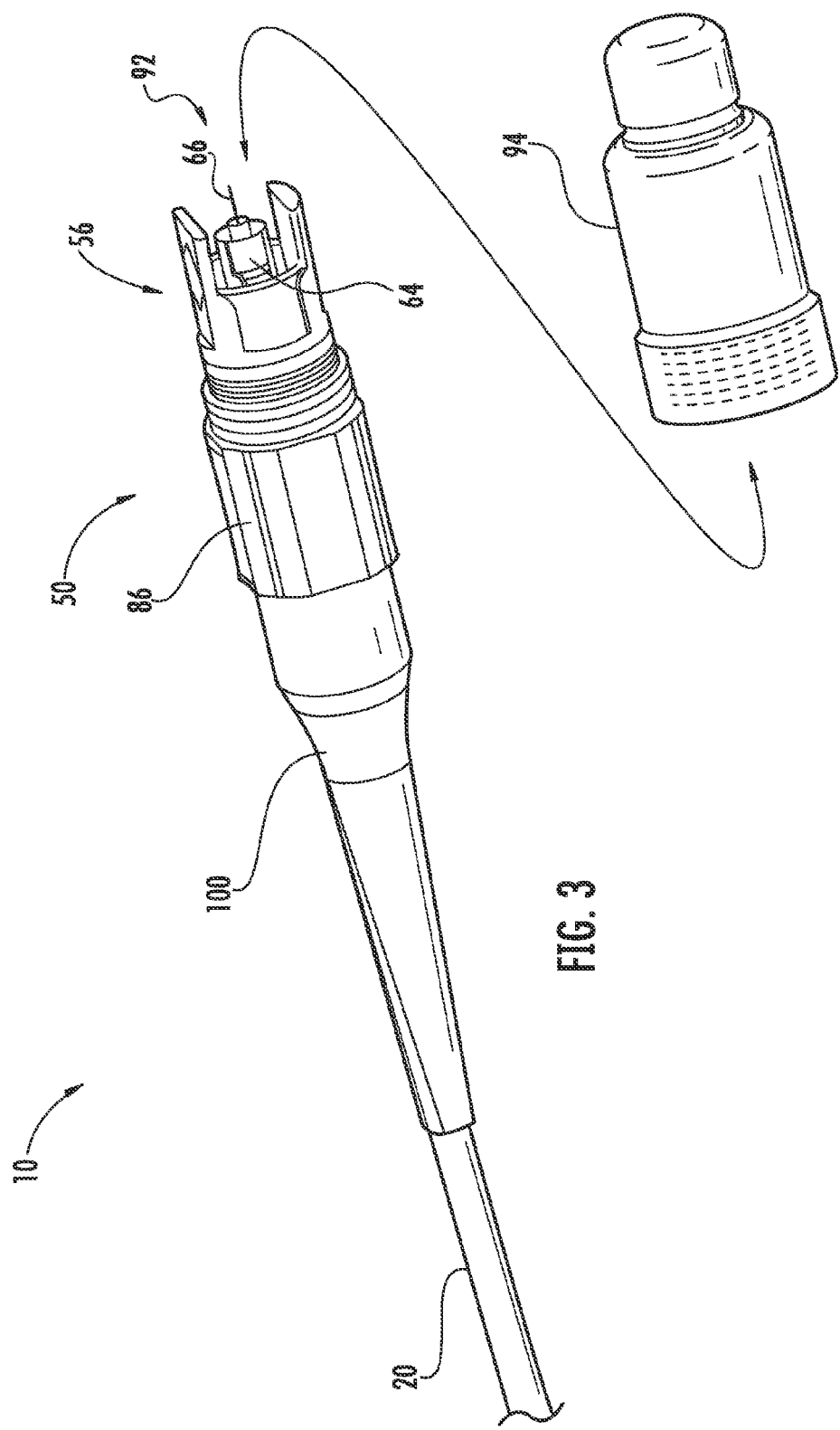
FIG. 3 is a perspective view of the assembled drop cable assembly of FIG. 2, further showing a protective end cover.
Figure 4:
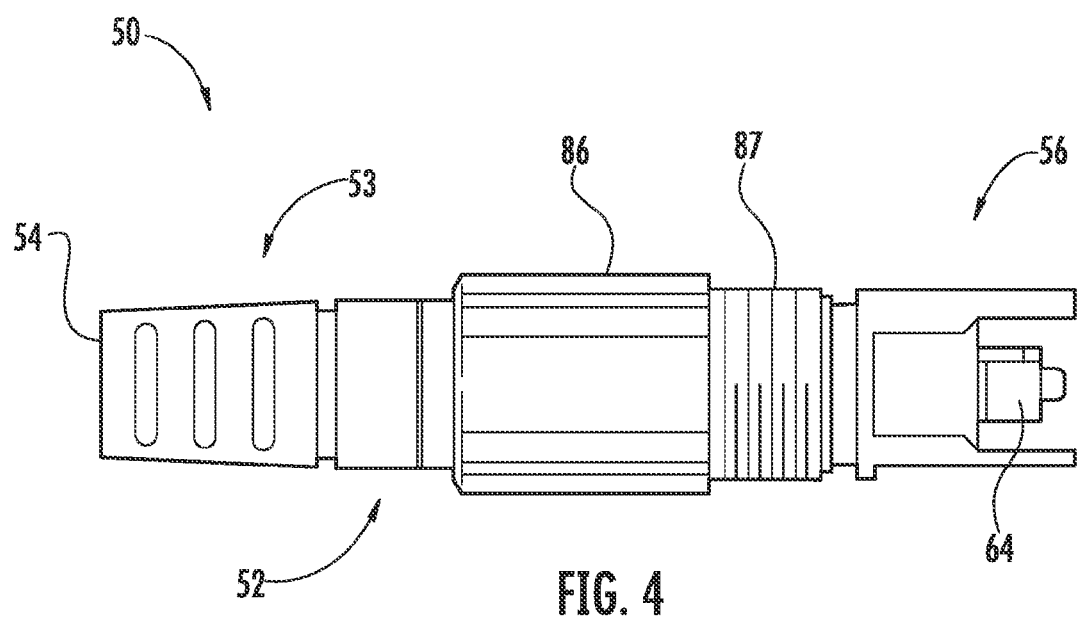
FIG. 4 is a side view of an example connector for the drop cable assembly.

FIG. 2 is an exploded perspective view of an example assembly 10 according to FIG. 1, and FIG. 3 is a perspective view of the assembled cable assembly that further includes a threaded dust cap 94. FIG. 4 is a side view of an example connector 50. Versions of the example connector 50 shown in FIG. 2 through FIG. 4 are described in U.S. Pat. Nos. 6,579,024 and 6,648,520, which patents are incorporated by reference herein, and which connector is an OptiTap® connector, a trademarked name of Corning Cable Systems Brands, Inc.

With reference now to FIG. 2, connector 50 includes an outer housing 52 with a rear portion 53 having an open back end 54 and also having a shrouded, open front end 56. A crimpable inner body portion 60 with a front end 62 slides into the outer housing through shrouded front end 56. Front end 62 of inner body portion 60 is adapted to receive and hold a ferrule assembly 64, which is configured to hold at least one optical fiber 66. Connector 50 includes a crimpable guide tube 70 that slides into outer housing back end 54 and is used to guide and hold cable 20 (or a stripped portion thereof) within outer housing 52.

Connector 50 further includes a heat-shrink member 76 (e.g., a heat-shrink tube) having a wider open front end 77 that fits over and surrounds the outer housing rear portion 53, and a narrower back end 78 that fits over and surrounds a portion of drop cable 20. Once so arranged, heat-shrink member 76 is heat-shrunk so that it tightly engages outer housing rear portion 53 and the portion of cable 20 adjacent thereto. Strain-relief member 100, which is discussed in greater detail below, slides over heat-shrink member 76 and the outer housing rear portion 53 and is affixed (e.g., snug fit) thereto. The narrow portion of the cone-like strain-relief member 100 extends away from connector 50 and snugly surrounds the portion of cable 20 that extends from outer housing rear portion 53. In an example, strain-relief member 100 forms a water-tight seal with cable 20 and connector 50. An example range of the length L of strain-relief member 100 (FIG. 1) is 90 mm≦L≦130 mm. In an example embodiment, strain-relief member 100 has a length L such that it covers heat-shrink member 76

In an example, connector 50 also includes a coupling nut 86 with a threaded front end 87. Coupling nut 86 slides over the portion of the strain-relief member 100 that covers outer housing rear portion 53, and seals to the outer body portion with an O-ring 90. The threaded front end 87 engages with the threaded dust cap 94 (FIG. 3) that covers what is otherwise an exposed open end 92 of connector 50.

Figure 5:
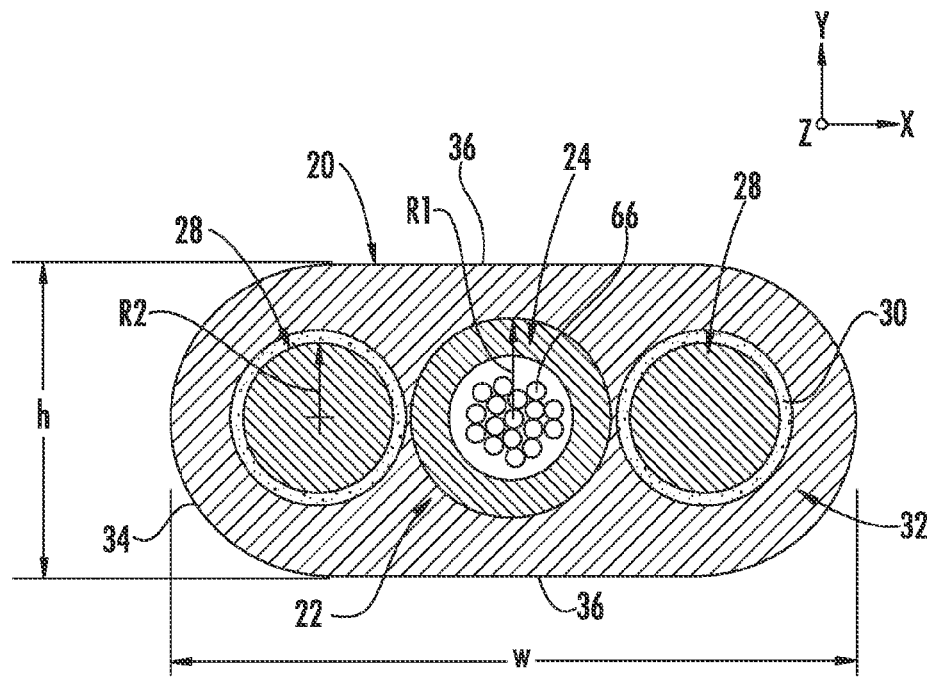
FIG. 5 and FIG. 6 are cross-sectional views of example fiber optic cables for use in the drop cable assembly of FIG. 1.
Figure 6:
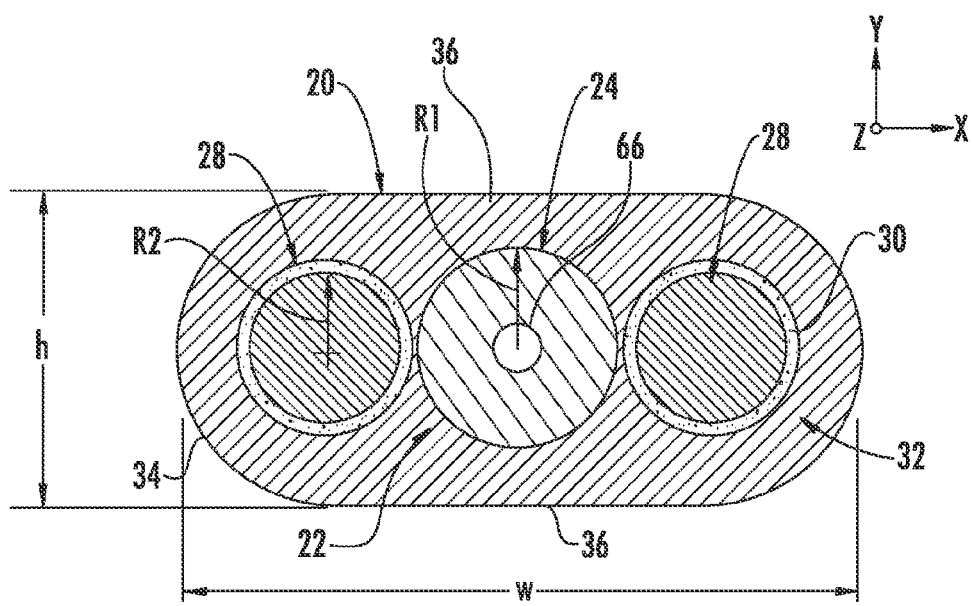

FIG. 5 and FIG. 6 are cross-sectional views of an example cable 20 as described, for example, in U.S. Pat. No. 6,501,888, which patent is incorporated by reference herein. Exemplary drop cables are ROC™, RPX®, SST-Drop™, and ALTOS® Figure-8 Loose Tube cables, available from Corning Cable Systems LLC, Hickory, N.C. The term "flat" cable as used herein means a cable that has a generally elongate cross-sectional shape, and need not have a flat side per se, but can have a rounded shape, oval shape, a figure-eight shape, an inwardly concave shape, etc.

Cable 20 includes at least one optical transmission component 22. In one example, optical transmission component 22 includes a buffer tube 24 having at least one optical fiber 66 loosely received therein, as shown in FIG. 5. In another example, optical transmission component 22 includes a buffer tube 24 with at least one optical fiber 66 tightly received therein, as shown in FIG. 6. Optical fiber 66 can be any type of optical fiber including, for example, single mode, multi-mode, dispersion-shifted fiber, etc. Buffer tube 24 has a nominal radius R1 (e.g., of about 1.5 mm), and is formed, for example, from polypropylene and blends thereof, or polyethylene and blends thereof.

In an example cable 20, optical transmission component 22 is disposed between at least two strength components 28. Example strength components 28 include single, unitary rod-like members formed of a dielectric material, for example, glass reinforced plastic (GRP). Strength components 28 have a nominal radius R2. In one example, strength components 28 have a coating 30 adhered to respective outer surfaces thereof. An example coating 30 comprises a water-swellable powder in a plastic matrix. Examples of nominal radius R2 are 0.625 mm, 1.025 mm and 1.275 mm. In an example, R2>R1. In one example, strength components 28 have a flexural modulus of about 10 GPa to about 100 GPa, while in another example the strength components have a flexural modulus of about 50 GPa to about 60 GPa.

Optical transmission component 22 and strength components 28 are surrounded by a cable jacket 32 that defines a generally flat-sided cable 20. An example jacket 32 includes generally arcuate sections 34 and generally flat-sided or rounded sections 36. In various examples, cable 20 has a width w in the range from about 5.0 mm to about 10 mm, and a height h in the range from about 1.5 mm to about 5.0 mm.

In one embodiment, strength components 28 are located generally adjacent to and on opposite sides of optical transmission component 22. At least one of strength components 28 may be in contact with at least a portion of optical transmission component 22. Alternatively, jacketing material can be interposed between the optical transmission component 22 and at least one strength component 28. Additionally, in an example, the respective centers of strength components 28 and optical transmission component 22 are generally aligned along a preferential bend axis, which is the X-axis in FIG. 5 and FIG. 6, i.e., strength components 28 and optical transmission component 22 lie in a common plane when the cable is laid flat. The X-axis is the preferential bend axis because cable 20 can be more easily bent around the X-axis than the Y-axis. The Y-axis is thus the non-preferential bend axis because it is more difficult to bend cable 20 with the cable lying flat in the X-Z plane. The orientations of strength components 28 relative to optical transmission component 22 define the preferential and non-preferential bend axes. Strength components 28 need not have a round cross-section such as shown in FIG. 5 and FIG. 6, and can have other cross-sectional shapes.

Figure 7:
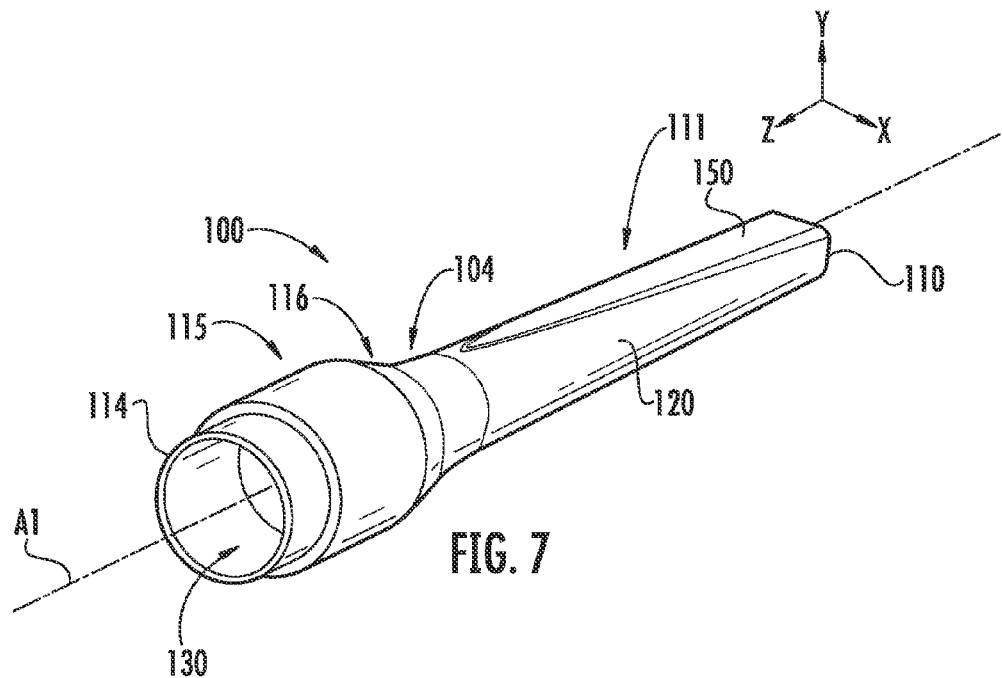
FIG. 7 and FIG. 8 are front and rear perspective views of an example strain-relief member of the present disclosure.
Figure 8:
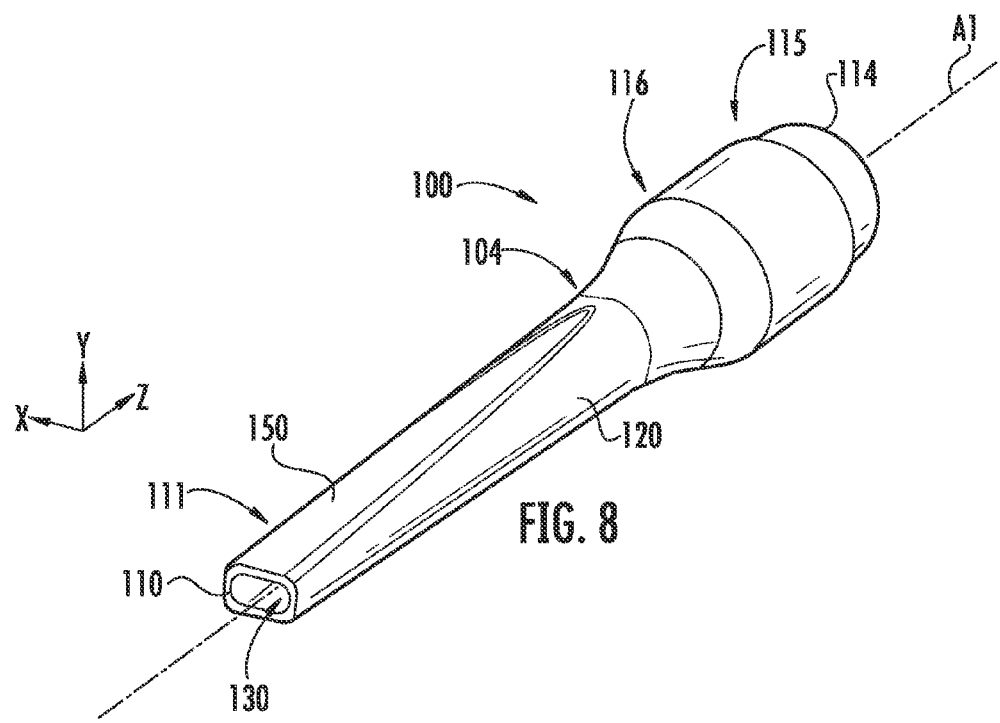
Figure 11:
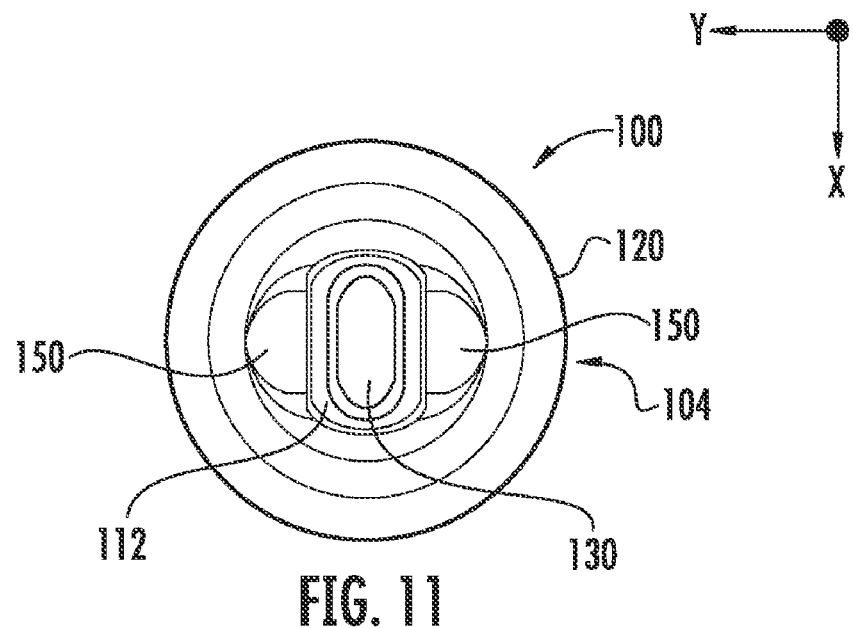
FIG. 11 and FIG. 12 are back-end and front-end views, respectively, of the strain-relief member shown in FIG. 9 and FIG. 10.
Figure 12:
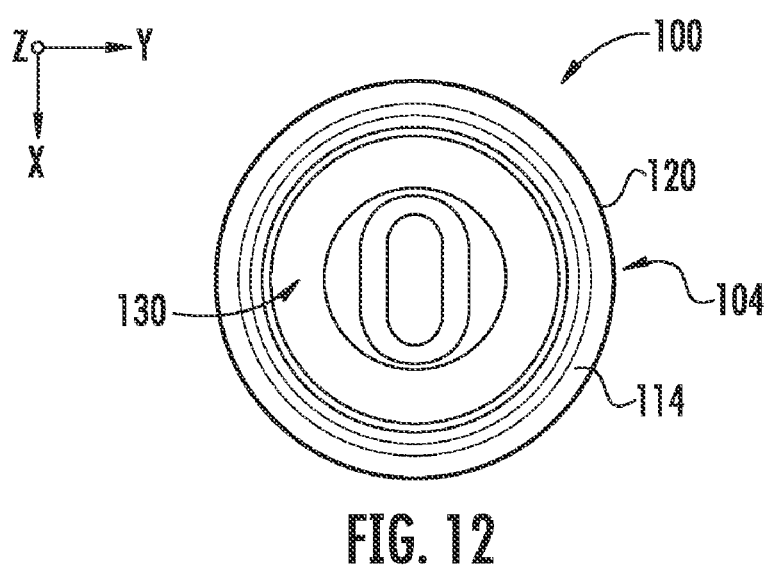

FIG. 7 and FIG. 8 are front and rear perspective views of an example strain-relief member 100. FIG. 9 and FIG. 10 are top-down and side views of strain-relief member 100 as shown in FIG. 7 and FIG. 8. FIG. 11 and FIG. 12 are back-end and front-end views of strain-relief member 100, while FIG. 13 and FIG. 14 are cross-sectional views of the strain-relief member as taken in the Y-Z and X-Z planes, respectively.

With reference to FIGS. 7-14, central axis A1 of strain-relief member 100 runs along the Z-direction. Strain-relief member 100 includes a body 104 having a cable end 110 at a generally tapered cable-end portion 111 having an elongate cross-section. Body 104 also includes a connector end 114 at a generally cylindrical cable-end portion 115 having a circular cross-section. Body 104 has an outer surface 120. Body 104 also includes a connector-end location 116 that corresponds to an axial position P1 where connector end 53 forms a termination interface with cable 20 (see FIG. 2). In an example, axial position P1 corresponds to the transition between tapered portion 111 and cylindrical portion 115 of body 104. Body 104 defines a central channel 130 centered on central axis A1 and that runs the length of body 104. Central channel 130 is open at cable end 110 and connector end 114.

In an example, central channel 130 includes different channel sections 130A, 130B, etc., having different cross-sectional sizes and shapes. FIG. 13 and FIG. 14 show an example with four different channel sections 130A through 130D. In an example, the shape and size of central channel 130 adjacent cable end 110 (e.g., sections 130A-130C) substantially matches the corresponding portion of cable assembly 10 covered by strain-relief member 100. Likewise, in an example, the shape and size of the section of central channel 130 that is adjacent connector end 114 (e.g., section 130D) corresponds to that of outer housing rear portion covered by heat-shrink member end 77 (FIG. 2).

An example material for strain-relief member 100 is block copolymer, such as RTP 2799, which is available from RTP Company, Winona, Minn. In an example, strain-relief member 100 is injection molded, slipped over cable 20 and secured to connector rear portion 53. In another example, strain-relief member 100 is pre-molded or overmolded in place on cable 20 and connector 50 when forming cable assembly 10.

Central channel 130 has an inner surface 132, and this inner surface and outer surface 120 define a wall thickness T for body 104 that varies at least in the axial direction (i.e., in the Z-direction), and generally also varies in the X- and Y-directions. The wall thickness T is generally thinnest at cable end 110 and gradually gets thicker towards connector end 114, with the maximum wall thickness near but not necessarily at the connector end, as can be seen the cross-sectional views of FIG. 11 and FIG. 12. In one example, the maximum wall thickness $T_{MAX}$ is at the connector-end location 116. In an example, wall thickness T is configured to provide a gradual transition from a minimum bending stiffness ratio at cable end 110 to a maximum bending stiffness ratio at connector end 116. The bending stiffness ratio is defined as the ratio of the maximum bending stiffness (product of Young's Modulus and area moment of inertia) divided by the minimum bending stiffness.

In the examples of FIGS. 7-14, wall thickness T is varied by providing beveled surfaces 150 on outer surface 120 on opposite sides of body 104. If strength components 28 of cable 20 lie in the X-Z plane (thereby defining the preferential bend axis as the X-axis), then the two beveled surfaces 150 are intersected by the Y-Z plane, i.e., the beveled surfaces lie above and below the flat-sided sections 36 of cable 20 (see FIG. 5 and FIG. 6) when the strain-relief member 100 engages cable 20. With reference to FIG. 13 and FIG. 14, beveled surfaces 150 provide thinner walls in the Y-direction than in the X-direction so that strain-relief member 100 has less stiffness about the preferential bend axis and more stiffness about the non-preferential bend axis.

In an example embodiment, wall thickness T at cable end 110, which is denoted $T_{110}$, is in the range from 0.4 mm≦$T_{110}$≦0.7 mm to create as smooth a transition as possible between strain-relief member end 110 and cable 20. This minimizes the amount of strain imparted to cable 20 at the cable end 110 of strain-relief member 100 when the cable is bent. This is especially true in cold conditions. An exemplary value for $T_{110}$ is 0.65 mm.

In one example, strain-relief member 100 is constructed of a single material (e.g., the aforementioned block copolymer), and the body wall defined by inner and outer surfaces 132 and 120 is solid and generally comprised of smooth curves. However, other combinations of materials and/or other geometries can also provide the appropriate bending and torsional stiffness transition along the length L of cable assembly 10 to limit the strain in strength components 28 to less than their failure strain. Multiple materials and geometric features can also be employed, such as a layered construction, discrete regions of different material, protrusions, indentations, holes, slots, grooves, etc., to achieve the desired performance properties.

One problem cable assembly 10 can experience is lateral torsional buckling, which is the twisting of the cable assembly and the subsequent collapse of strength components 28 when subjected to a mechanical load. This effect arises because of the disparity between the maximum and minimum bending stiffnesses when cable assembly 10 is bent about the non-preferential bending axis. The greater this disparity, the greater the buckling potential, which drives the torsion about the cable assembly axis AC. Lateral torsional buckling can occur, for example, when cable assembly 10 is subjected to a mechanical load at or near the cable end 110 of strain-relief member 100. Such loads occur, for example, when cable assembly 10 is deployed in the field as a drop cable. Cable assembly 10 is designed to meet fairly stringent mechanical load requirements over a wide range of temperature conditions, e.g., between −30° C. and +40° C., and also between −40° C. and +40° C., as discussed below.

At a given stiffness ratio, the rotational orientation of the portion of cable assembly 10 that includes strain-relief member 100 is controlled by the torsional stiffness of this cable assembly portion. A mechanical load placed on cable 20 at or near cable end 110 of strain-relief member 100 can bend this portion of cable assembly 10, with the bending stiffness controlling the bend radius for the given mechanical load.

FIG. 15 is a schematic diagram of cable assembly 10 attached at connector 50 to a strain-test measurement fixture ("fixture") 200. A weight 210 (e.g., 10 lbs or 15 lbs) is secured to cable 20 at an axial distance D from connector end 53. In an example embodiment, distance D is 11 inches. Fixture 200 is configured to provide select amounts of torsion as measured by a torsion angle $\phi$ and select amounts of bending as measured by a bend angle $\theta$, thereby allowing for flex testing and proof testing of cable assembly 10 over a wide range of load, bending and torsion conditions.

Example flex and proof testing standards are discussed, for example, in Telcordia GR-3120, a publication that sets forth generic requirements for hardened optical fiber connectors, and which is available from Telcordia Technologies, Inc., Piscataway, N.J., and which is incorporated by reference herein by way of background information.

The Telcordia GR-3120 flex test is conducted at −40° C. and +40° C. and consists of the following steps: a) place test sample and any test fixture in an environmental chamber and set temperature to −40° C.; b) measure the insertion loss and the reflectance; c) apply a 4.5 kgf (10 lbf) load; d) rotate the angle of the test fixture arm through the following cycle: $\theta=0°$, +90°, 0°, −90°, 0°, and repeat for 8 cycles; e) remove the load; f) measure the change in the insertion loss and the reflectance; g) set the temperature to +40 C; and h) repeat steps b) through f).

The Telcordia GR-3120 proof test is conducted at +23° C.+/−2° C. and involves mounting cable assembly 10 in fixture 200 with $\phi=0°$ and measuring the insertion loss and reflectance. Three different tests are then carried out for the proof test: A straight pull (bend angle $\theta=0°$), a +90° side pull (i.e., a bend angle $\theta=+90°$), and a tensile load test (bend angle $\theta=0°$).

The straight pull test is carried out by: a) applying a 11.3 kgf (25 lbf) load at $\theta=0°$ for at least 60 seconds; b) remove the load, and after 10 seconds measure the insertion loss and the reflectance; c) apply a 22.7 kgf (50 lbf) load at $\theta=0°$ for at least 60 seconds; and d) remove the load, and after at least 10 seconds, measure the insertion loss and reflectance.

The 90° side-pull rest is carried out by: a) applying a 6.8 kgf (15 lbf) load at $\theta=+90°$ for at least 60 seconds; b) remove the load, and after at least 20 seconds measure the insertion loss and the reflectance; c) apply a 11.3 kgf (25 lbf) load at $\theta=+90°$ for at least 60 seconds; and d) remove the load, and after at least 20 seconds, measure the insertion loss and the reflectance.

The tensile load test is carried out by: a) applying a 45.4 kgf (100 lbf) load at $\theta=0°$ for at least 60 seconds; b) remove the load, and after at least 20 seconds measure the insertion loss and the reflectance; c) apply a 75.8 kgf (167 lbf) load at $\theta=+90°$ for at least 60 seconds; and d) remove the load, and after at least 20 seconds, measure the insertion loss and the reflectance.

In FIG. 15, connector 50 of cable assembly 10 is shown being held in fixture 200 so that the cable assembly hangs with its central axis AC along the vertical direction, i.e., the direction of gravity, as indicated by arrow V. Thus, central axis AC forms a bend angle $\theta=0°$ (nominal) with the vertical direction V, and is at right angles to the horizontal, which is denoted by arrow H. Fixture 200 is capable of rotating connector 50 about its central axis AC by torsion angle $\phi$, as shown in the front-on, close-up view of FIG. 16.

Figure 17:
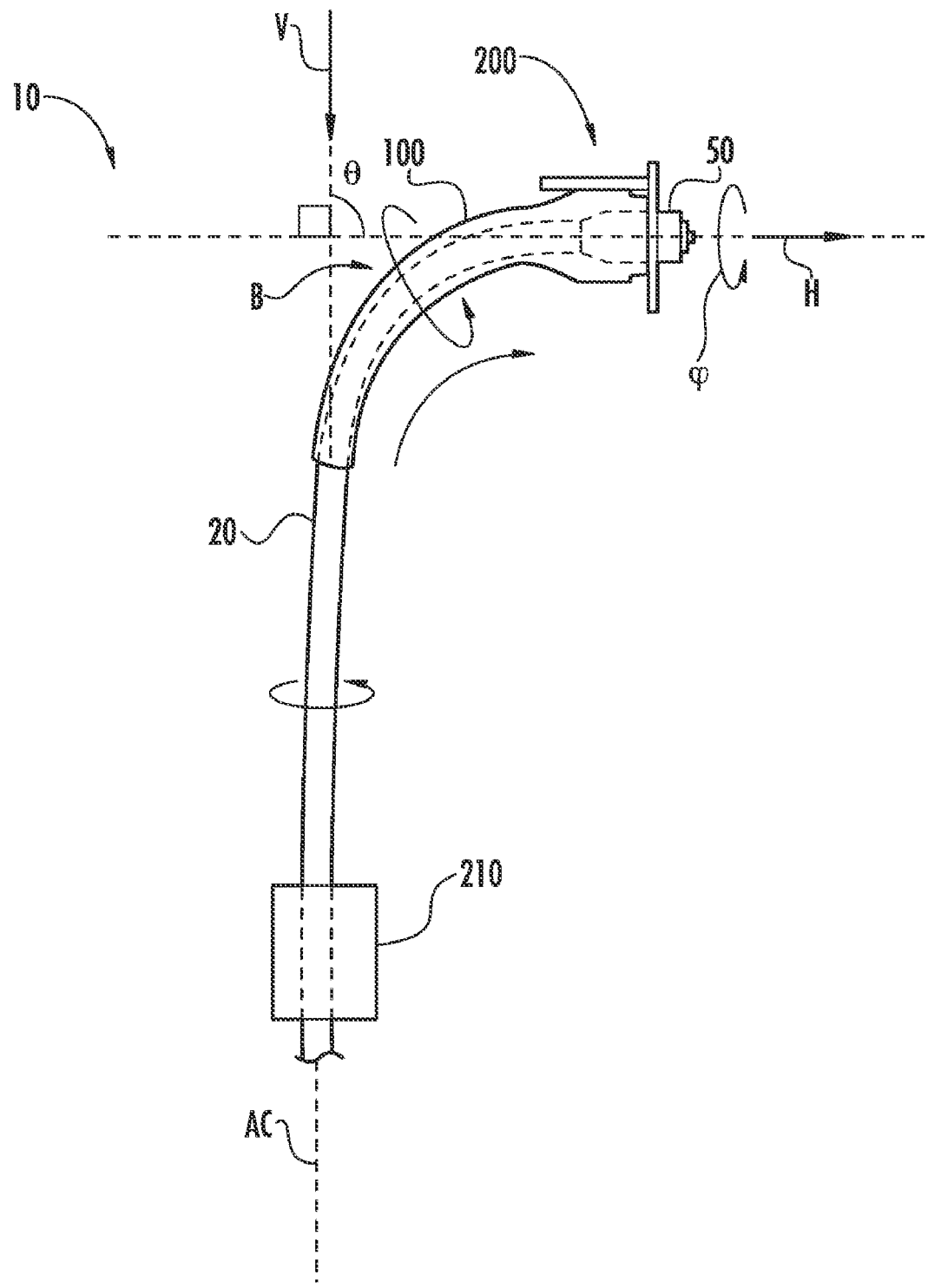
FIG. 17 is similar to FIG. 15, and shows an example configuration where the drop cable assembly is rotated (bent) by θ=+90° and twisted by φ=+90°.

FIG. 17 is similar to FIG. 15 and shows fixture 200 arranged in a flex-test configuration wherein cable assembly 10 is shown having a bend B with an angle $\theta=+90°$ and a torsion angle $\phi=+90°$ that provides a twist. Providing a twist of $\phi=+90°$ serves to place cable assembly 10 in a position that imposes the maximum strain on strength components 28 because it causes cable 20 to bend about its non-preferential bend axis. Applying a torsional angle of $\phi=0°$ and a bend angle of $\theta=+90°$ serves to bend cable assembly 10 about its preferential bend axis. Applying a torsional angle of $\phi=+45°$ and a bend angle of $\theta=+90°$ serves to bend cable assembly 10 about an intermediate axis between the preferential and non-preferential bend axes.

The diameter of and the distance between strength components 28 affects the amount of strain that builds up in the strength components when cable assembly 10 is subjected to a mechanical load. The minimum breaking strain of commercially available GRP strength components is in the range from about 4.1% to about 6.3%.

When cable assembly 10 was fitted with a conventional SST strain-relief boot over a shrink-wrap layer, the modified cable assembly failed both the −30° C. and +40° C. flex test at $\theta=+90°$, and the proof test. Accordingly, such conventional strain-relief boots are unsuitable for use with drop cable assemblies having a preferential bend axis.

Flex tests were then conducted on cable assembly 10 based on a modified version of the Telcordia GR-3120 flex test. The modified flex test was carried out at −30° C. and +40° C. using a 15 lb weight 210. For each of these temperatures, the torsional angle $\phi$ was set to $\phi=0°$, +45° and +90° and for each of these angles the bend angle $\theta$ was varied between $\theta=-90°$ and +90°. Cable assembly 10 passed both this modified flex test and the Telcordia GR-3120 proof test.

Strain-relief member 100, when operably disposed in cable assembly 10, limits the amount of strain in strength components 28 to less than their strain limit when subjected to above-described modified flex test and the proof test. Thus, strain-relief member 100 is intended to reduce and in many cases prevent breakage of strength components 28. In the case of GRP-based strength components 28, the strain is limited to less than 0.041 (i.e., 4.1%). In an alternate embodiment, the strain is limited to less than about 0.041. This allows for GRP-based strength components 28 to be used in cable assembly 10 over a relatively wide range of temperature and mechanical load conditions.

Figure 18:
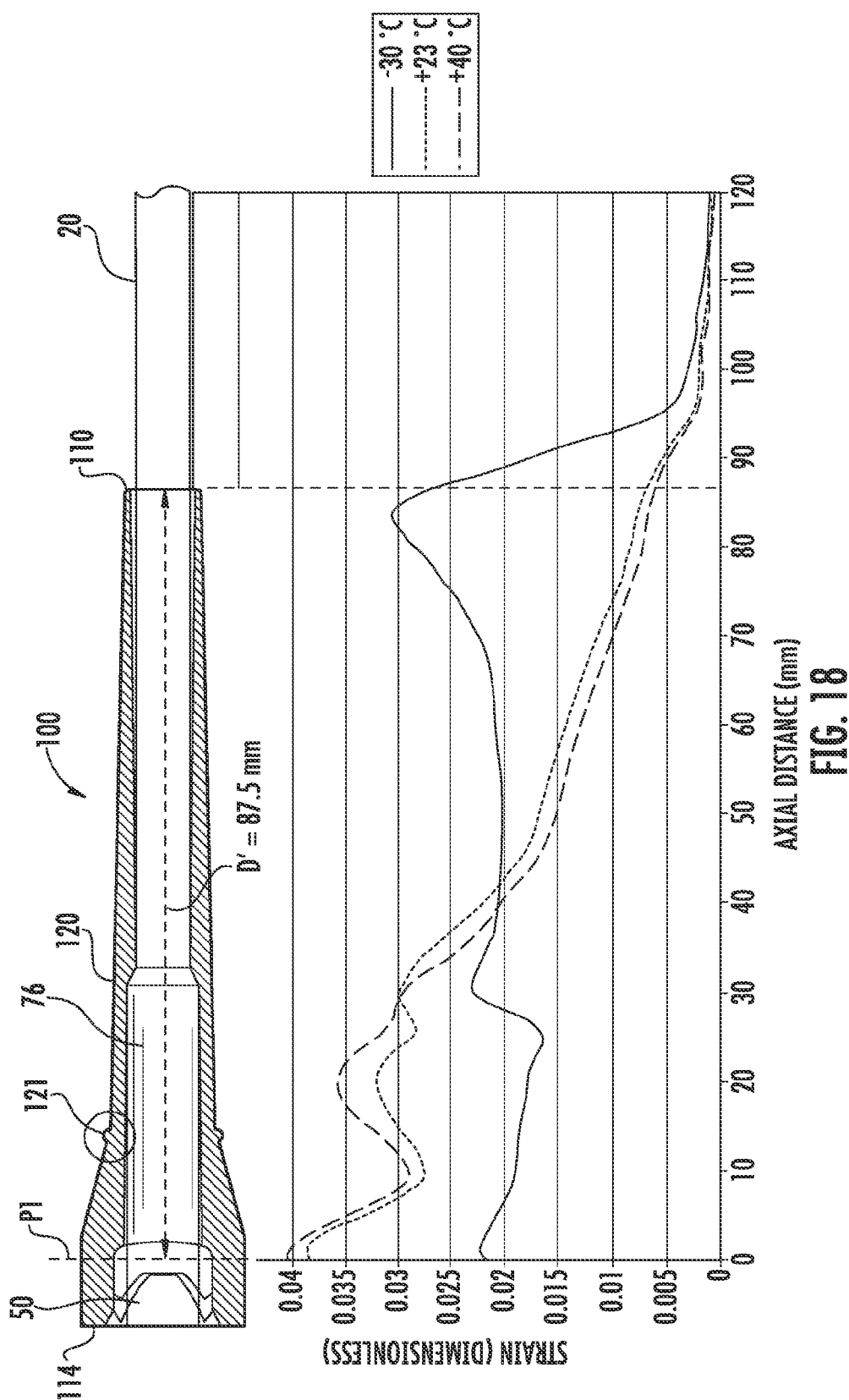
FIG. 18 plots modeled results of the Strain vs. Distance (mm) for a cable assembly having two GRP strength components and the strain-relief member of the present disclosure.

FIG. 18 is a plot of the modeled strain in strength components 28 of an example cable assembly 10 as calculated in the Z-direction (i.e., axial direction) from where connector 50 is attached to fixture 200 (see FIGS. 15-17). Strain-relief member 100 is superimposed on the plot in FIG. 18 for the sake of reference, and extends a distance D'=87.5 mm (see FIG. 15). The modeled cable assembly 10 included a cable 20 with two GRP strength components 28, along with strain-relief member 100 as shown and described above. Strain-relief member 100 as shown in FIG. 18 includes near cable end 114 an annular bump 121 that runs around the outer surface 120. Bump 121 serves to engage a lanyard (not shown) and does substantially contribute to the strain-relief properties of strain-relief member 100.

The modeling was carried out to replicate the modified flex-test conditions discussed includes results obtained at −30° C., +23° C. and +40° C. The modeled results of FIG. 18 confirms the experimental results that strain-relief member 100, when employed in a cable assembly 10, is capable of keeping the strain on the GRP strength components to below their strain breaking point of 0.041 for the wide range of temperatures associated with present-day standards for hardened fiber optic connectors. In particular, even though testing and modeling were conducted at a low-end temperature of −30° C., the modeling and test results indicate that cable assembly 10 with strain-relief member 100 can pass the flex test and the proof test over the temperate range from −40° C. to +40° C.

Note that in the plot of FIG. 18, the values of strain within 1.5 mm from axial position P1 are considered the same as the value for strain at 1.5 mm because of the non-ideal boundary condition imposed at the connector end. Also of interest in FIG. 18 is the local maximum in the plot for +40° C. at the axial distance of about 20 mm, then the relatively monotonic decrease in stress from this local maximum to the strain-relief member end 110, and then a small and substantially negligible step near the strain-relief member end. This illustrates that strain-relief member 100 provides good strain control along what is often the most problematic portion of cable assembly 10.

The plot for −30° C. is interesting in that the maximum strain occurs very near to strain-relief member end 110 and then relatively steeply decreases with distance down cable 20. This indicates that in cold conditions, the portion cable 20 beyond strain-relief member end 110 carries a fair amount of the strain, which is explained by the fact that the cable is significantly less flexible when cold. Still, the maximum strain is only about 0.03 and thus well below the threshold strain limit of 0.041. In this regard, as discussed above, the wall thickness $T_{110}$ at cable end 110 is made as thin as possible to create as smooth a transition as possible between strain-relief member 100 and cable 20 to minimize the size of the discontinuity.

It will be apparent to those skilled in the art that various modifications to the preferred embodiment of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A fiber optic drop cable assembly, comprising:
 a fiber optic cable having strength components that define a preferential bend axis, and having an end portion;
 a fiber optic connector operably coupled to the fiber optic cable at the end portion of the fiber optic cable;
 a strain-relief member comprising a cylindrical portion at a connector end connected to the fiber optic connector and a tapered portion extending axially from the cylindrical portion and surrounding the fiber optic cable, an outer surface of the strain relief member reducing in outer dimension from the cylindrical portion to the tapered portion, the strain-relief member comprising a wall formed of a flexible material having varying wall thickness to limit an amount of strain in the strength components within the strain relief member to less than 0.041 when subjected to a flex test carried out at −40° C. and +40° C., with −90° and +90° bends, at torsion angles of 0°, +45° and +90°, and with a 15 lb load;
 wherein the wall of the strain relief member has a maximum wall thickness in the cylindrical portion, the varying wall thickness decreasing from the maximum wall thickness in the cylindrical portion along a length of the tapered portion.

2. The assembly of claim 1, wherein the strain-relief member limits the amount of strain in the strength components to less than 0.041 when subjected to a proof test.

3. The assembly of claim 1, wherein the fiber optic cable includes an optical transmission component and at least two strength components.

4. The assembly of claim 3, wherein two strength components are disposed on either side of the optical transmission component so as to lie in a common plane therewith.

5. The assembly of claim 4, wherein the strain-relief member includes the outer surface having flat beveled surfaces on opposite sides of said common plane.

6. The assembly of claim 3, wherein the two strength components comprise glass-reinforced plastic and the strain-relief member comprises a block copolymer.

7. The assembly of claim 1, wherein the strain-relief member is one of:
 injection molded and slid over the fiber optic cable end;
 overmolded on the fiber optic cable end portion; and
 pre-molded on the fiber optic cable end portion.

8. The assembly of claim 1, wherein the strain-relief member has a length L in a range 90 mm≦L≦130 mm.

9. The assembly of claim 1, wherein the strain-relief member has a narrow end with a wall thickness in a range from 0.4 mm to 0.7 mm.

10. The assembly of claim 1, wherein the connector includes:
 an outer housing having an end portion; and
 a heat-shrink member that covers the outer housing end portion and part of the fiber optic cable end portion.

11. A strain-relief member for a fiber optic drop cable assembly having fiber optic cable with a preferential bend axis defined by strength components, and a connector operably connected to the fiber optic cable, comprising:
 a body formed from block copolymer and defining a central channel along a central axis, a generally cylindrical connector-end portion with a circular cross-section channel section sized to surround an end-portion of the connector, and a generally tapered cable-end portion with an elongate cross-section channel section sized to surround an end portion of the fiber optic cable that connects to the connector, the body decreasing in outer dimension between the cylindrical connector-end portion and the tapered cable-end portion; and
 wherein the strain-relief member comprises a wall formed of a flexible material having varying wall thickness surrounding the strength components to limit an amount of strain in the strength components within the strain relief member to less than 0.041 when subjected to a flex test carried out at −40° C. and +40° C., with −90° and +90° bends, at torsion angles of 0°, +45° and +90°, and with a 15 lb load;

wherein the wall of the strain relief member has a maximum wall thickness in the cylindrical connector-end portion, the varying wall thickness decreasing from the maximum wall thickness in the cylindrical connector-end portion and along a length of the tapered portion.

12. The assembly of claim 11, wherein the strain-relief member limits the amount of strain in the strength components to less than 0.041 when subjected to a proof test.

13. The strain-relief member of claim 11, wherein the body has an axial length L in a range 90 mm≦L≦130 mm.

14. The strain-relief member of claim 11, wherein the tapered cable-end portion has an end at which the wall thickness is in a range from 0.4 mm to 0.7 mm.

15. The strain-relief member of claim 11, wherein the fiber optic cable has two strength components disposed on either side of an optical transmission component and that lie in a common plane therewith, and wherein the strain-relief member body includes an outer surface having flat beveled surfaces on opposite sides of the common plane.

16. A fiber optic drop cable assembly, comprising:
a fiber optic cable having a central optical transmission component and strength components that define a preferential bend axis;
a fiber optic connector operably coupled to the fiber optic cable; and
a strain-relief member having a body formed from block copolymer and defining a central channel along a central axis, the body having a generally cylindrical connector-end portion with a circular cross-section channel section sized to surround an end-portion of the connector, and a generally tapered cable-end portion with an elongate cross-section channel section sized to surround an end portion of the fiber optic cable that connects to the connector, the tapered cable-end portion including flat beveled surfaces located on opposite sides of the central axis of the strain-relief member that extend toward the central axis from the cylindrical connector-end portion toward a cable end of the tapered cable-end portion; and
the strain-relief member comprises a wall formed of a flexible material having varying wall thickness to limit an amount of strain in the strength components within the strain relief member to less than 0.041 when subjected to a) a flex test carried out at −40° C. and +40° C. with −90° and +90° bends, at torsion angles of 0°, +45° and +90°, and with a 15 lb load, and b) a proof test.

17. The assembly of claim 16, wherein the fiber optic cable includes two strength components disposed on either side of the optical transmission component so as to lie in common plane therewith, and wherein the strain-relief member body includes an outer surface having beveled surfaces on opposite sides of the common plane.

18. The assembly of claim 16, wherein the strength components comprise glass-reinforced plastic.

19. The assembly of claim 16, wherein the strain-relief member has a length L in a range 90 mm≦L≦130 mm and an end with a wall thickness in a range from 0.4 mm to 0.7 mm.

20. A fiber optic drop cable assembly, comprising:
a fiber optic cable, said fiber optic cable comprising at least one optical fiber therein and having at least two reinforced strength components therein, each having a flexural modulus of about 10 GPa to 100 GPa and arranged on generally opposing sides of said at least one optical fiber and defining a preferential bend axis and non-preferential bend axis in said cable, said cable further including an end portion;
a fiber optic connector, said fiber optic connector having a termination portion coupled to the fiber optic cable and defining a termination interface; and
a strain-relief member having a body and defining a central channel along a central axis, the body having a generally cylindrical connector-end portion surrounding the fiber optic cable end portion and secured to the fiber optic connector and being substantially water-tight about the termination interface, the strain-relief member having an axial length L extending along the length of said cable and a maximum width W transverse to the length of the cable located at the cylindrical connector-end portion defining a water-tight covering, the length and width defining an aspect ratio of L divided by W, and the aspect ratio being in a range of 3:1 to 10:1, the strain-relief member comprising a flexible material and configured to limit an amount of strain in the strength components to less than about 0.041;
wherein the strain relief member comprises a wall having varying thickness such that the strain relief member has less stiffness about the preferential bend axis and more stiffness about the non-preferential bend axis.

21. The assembly of claim 20, the assembly exhibiting said amount of strain when the assembly is subjected to a flex test carried out at −40° C. and +40° C. with −90° and +90° bends, at torsion angles of 0°, +45° and +90°, and with a 15 lb load.

22. The assembly of claim 20, wherein the strain-relief member has a length L in a range 90 mm≦L≦130 mm.

23. The assembly of claim 20, wherein the strain-relief member has a narrow end with a wall thickness in a range from 0.4 mm to 0.7 mm.

24. The assembly of claim 20, wherein the connector includes:
an outer housing having an end portion; and
a heat-shrink member that covers the outer housing end portion and part of the fiber optic cable end portion.

* * * * *